US012561858B2

(12) United States Patent
Li

(10) Patent No.: US 12,561,858 B2
(45) Date of Patent: Feb. 24, 2026

(54) METHOD AND APPARATUS FOR GENERATING SIGNED DISTANCE FIELD IMAGE OF TEXT, DEVICE, AND STORAGE MEDIUM

(71) Applicant: BEIJING ZITIAO NETWORK TECHNOLOGY CO., LTD., Beijing (CN)

(72) Inventor: Yitong Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 18/259,302

(22) PCT Filed: Jan. 14, 2022

(86) PCT No.: PCT/CN2022/071993
§ 371 (c)(1),
(2) Date: Jun. 26, 2023

(87) PCT Pub. No.: WO2022/161185
PCT Pub. Date: Aug. 4, 2022

(65) Prior Publication Data
US 2024/0054701 A1 Feb. 15, 2024

(30) Foreign Application Priority Data
Jan. 28, 2021 (CN) .......................... 202110121052.4

(51) Int. Cl.
*G06T 11/20* (2006.01)
*G06T 7/12* (2017.01)
(Continued)

(52) U.S. Cl.
CPC .............. *G06T 11/203* (2013.01); *G06T 7/12* (2017.01); *G06T 7/13* (2017.01); *G06V 10/761* (2022.01)

(58) Field of Classification Search
None
See application file for complete search history.

(56) References Cited

U.S. PATENT DOCUMENTS 8,379,025 B1* 2/2013 Carr ...................... G06T 15/005
345/426
9,607,414 B2* 3/2017 Hendrey ............ G01C 21/3874
(Continued)

FOREIGN PATENT DOCUMENTS

CN 105184837 A 12/2015
CN 107146268 A 9/2017
(Continued)

OTHER PUBLICATIONS

International Search Report (with English translation) and Written Opinion issued in PCT/CN2022/071993, dated Mar. 24, 2022, 15 pages provided.
(Continued)

*Primary Examiner* — Jeffrey J Chow
(74) *Attorney, Agent, or Firm* — Astute IP Law Group

(57) ABSTRACT

A method and apparatus for generating a signed distance field image, device, and storage medium. The method comprises: first, determining a valid line segment set corresponding to pixel points to be processed; then, determining internal and external position information of said pixel points on the basis of the valid line segment set of said pixel points; and finally, after the internal and external position information of each pixel point on an undirected distance field image of a target character is determined, generating a directed distance field image of the target character.

15 Claims, 4 Drawing Sheets

(51) Int. Cl.
  *G06T 7/13*       (2017.01)
  *G06V 10/74*      (2022.01)

(56)              References Cited

U.S. PATENT DOCUMENTS

| | | | |
|---|---|---|---|
| 10,134,182 | B1 | 11/2018 | Ma |
| 2010/0085357 | A1 | 4/2010 | Sullivan et al. |
| 2020/0134902 | A1* | 4/2020 | Seiler .................... G06T 11/001 |
| 2020/0279415 | A1* | 9/2020 | Betts ..................... G06T 11/203 |

FOREIGN PATENT DOCUMENTS

| | | | |
|---|---|---|---|
| CN | 107527055 | A | 12/2017 |
| CN | 111311723 | A | 6/2020 |
| CN | 111523531 | A | 8/2020 |
| CN | 112346409 | A | 2/2021 |
| WO | 2014025363 | A1 | 2/2014 |

OTHER PUBLICATIONS

JaryGuo, "About Fonts", https://blog.csdn.net/jaryguo/article/details/66475690, Mar. 26, 2017; cited in ISR, with English translation.
Notice of grant of invention patent right from Chinese patent application No. 202110121052.4, mailed on Apr. 28, 2025, 8 pages.

\* cited by examiner

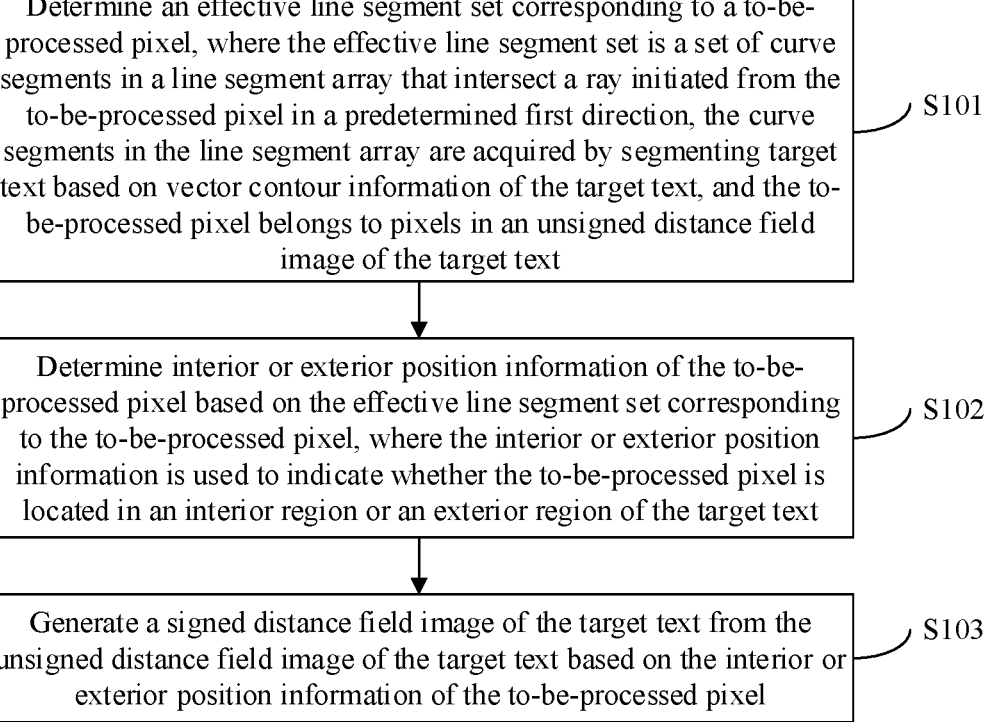

Determine an effective line segment set corresponding to a to-be-processed pixel, where the effective line segment set is a set of curve segments in a line segment array that intersect a ray initiated from the to-be-processed pixel in a predetermined first direction, the curve segments in the line segment array are acquired by segmenting target text based on vector contour information of the target text, and the to-be-processed pixel belongs to pixels in an unsigned distance field image of the target text — S101

Determine interior or exterior position information of the to-be-processed pixel based on the effective line segment set corresponding to the to-be-processed pixel, where the interior or exterior position information is used to indicate whether the to-be-processed pixel is located in an interior region or an exterior region of the target text — S102

Generate a signed distance field image of the target text from the unsigned distance field image of the target text based on the interior or exterior position information of the to-be-processed pixel — S103

Figure 1

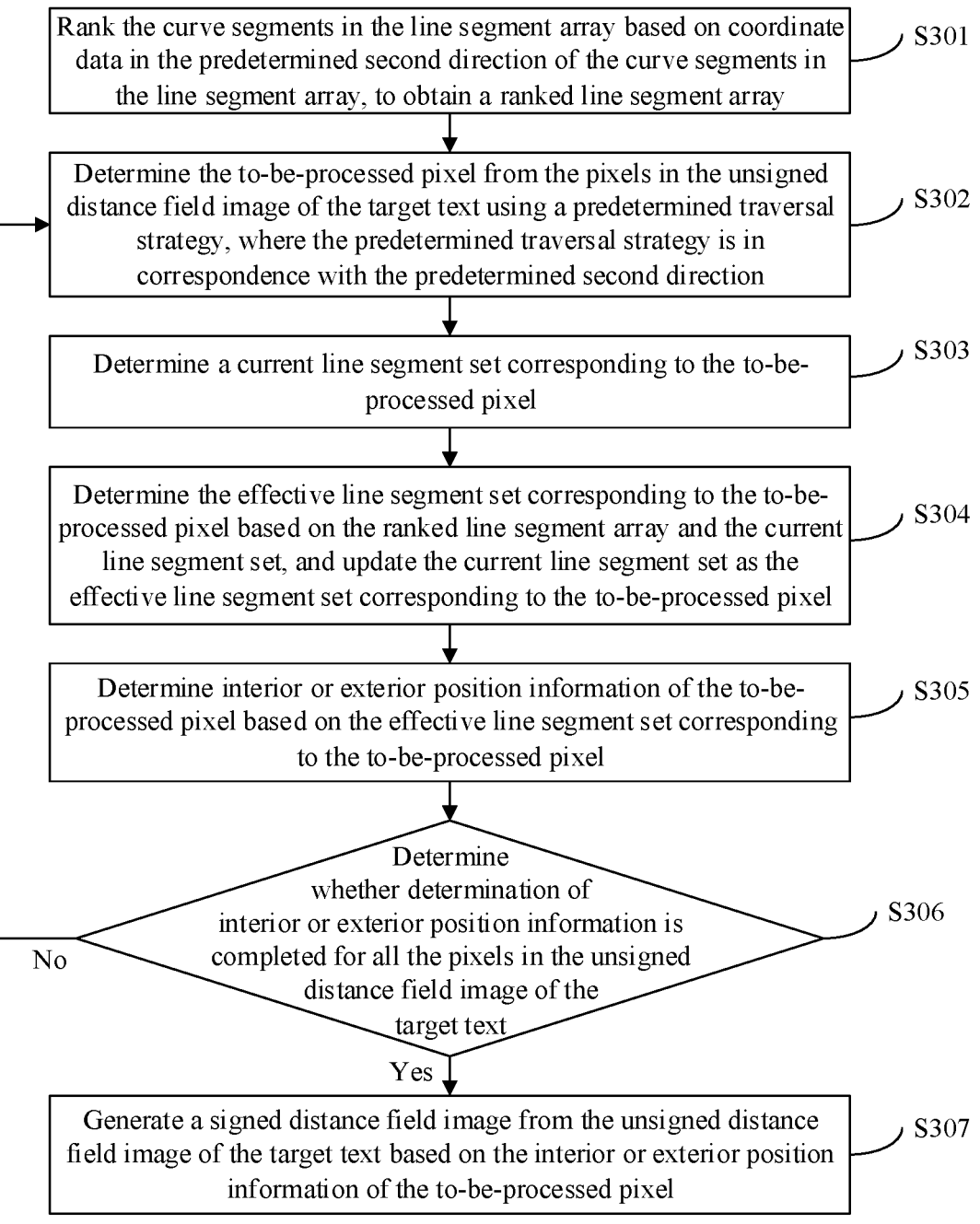

Rank the curve segments in the line segment array based on coordinate data in the predetermined second direction of the curve segments in the line segment array, to obtain a ranked line segment array — S301

Determine the to-be-processed pixel from the pixels in the unsigned distance field image of the target text using a predetermined traversal strategy, where the predetermined traversal strategy is in correspondence with the predetermined second direction — S302

Determine a current line segment set corresponding to the to-be-processed pixel — S303

Determine the effective line segment set corresponding to the to-be-processed pixel based on the ranked line segment array and the current line segment set, and update the current line segment set as the effective line segment set corresponding to the to-be-processed pixel — S304

Determine interior or exterior position information of the to-be-processed pixel based on the effective line segment set corresponding to the to-be-processed pixel — S305

Determine whether determination of interior or exterior position information is completed for all the pixels in the unsigned distance field image of the target text — S306

No

Yes

Generate a signed distance field image from the unsigned distance field image of the target text based on the interior or exterior position information of the to-be-processed pixel — S307

Figure 3

First determining module            401

Second determining module          402

First generating module            403

Memory            502

Input apparatus            503

Bus

Processor            501

Output apparatus            504

METHOD AND APPARATUS FOR GENERATING SIGNED DISTANCE FIELD IMAGE OF TEXT, DEVICE, AND STORAGE MEDIUM

This application is the national phase of International Patent Application No. PCT/CN2022/071993 filed on Jan. 14, 2022, which claims priority to Chinese Patent Application No. 202110121052.4 titled "METHOD AND APPARATUS 5 FOR GENERATING DIRECTED DISTANCE FIELD IMAGE, DEVICE, AND STORAGE MEDIUM," filed on Jan. 28, 2021, with the China National Intellectual Property Administration (CNIPA), both of which are incorporated herein by reference in their entireties.

This application claims the priority to Chinese Patent Application No. 202110121052.4 titled "METHOD AND APPARATUS FOR GENERATING DIRECTED DISTANCE FIELD IMAGE, DEVICE, AND STORAGE MEDIUM", filed on Jan. 28, 2021 with the China National Intellectual Property Administration (CNIPA), which is incorporated herein by reference in its entirety.

FIELD

The present disclosure relates to the field of data processing, and in particular to a method and an apparatus for generating a signed distance field image, a device and a storage medium.

BACKGROUND

Distance field images are not distorted at a large scaling ratio compared to normal bitmap text. Therefore, the distance field images are more suitable for processing text effects.

A distance field image of text records a minimum distance from each of pixels inside and outside the text to a contour (also referred to as a boundary) of the text, where the minimum distance is also referred to as a distance field value. In a signed distance field image, distance field values of pixels inside the text are set to negative numbers, and distance field values of pixels outside the text are set to positive numbers.

A method for generating a signed distance field image of text includes a line-drawing phase, a shape-drawing phase, and a color reverse and signed transformation phase for the distance field image. During the line-drawing phase, an unsigned distance field image of text is drawn. During the shape-drawing phase, it is to determine whether each of pixels in the unsigned distance field image is located in an interior region of the text or an exterior region of the text. During the color reverse and signed transformation phase, based on the determined position information that each of pixels is located in the interior region or the exterior region, color reverse processing is performed, in the unsigned distance field image, for pixels located in the interior region of the text. Finally, the signed distance field image of the text is obtained.

Specifically, during the shape-drawing phase, in the process of determining whether each of the pixels in the unsigned distance field image is located in the interior region of the text or the exterior region of the text, it is required to traverse all curve segments forming the text, to determine curve segment(s) intersecting rays initiated from the pixel, and then determine whether the pixel is located in the interior region of the text or the exterior region of the text according to the odd-even rule or the non-zero winding number rule.

It is required to determine interior or exterior position information of a large number of pixels in the unsigned distance field image. If traversing all curve segments forming the text is to be performed for each of the pixels to determine the interior or exterior position information of the pixel, the processing efficiency is low, ultimately resulting in a low efficiency of generating the signed distance field image of the text.

SUMMARY

In order to solve the above technical problem or at least partially solve the above technical problem, a method and an apparatus for generating a signed distance field image, a device and a storage medium are provided according to embodiments of the present disclosure, in which the efficiency of determining whether a pixel is located in an interior region of text, thereby improving the overall efficiency of generating the signed distance field image of the text.

A method for generating a signed distance field image is provided according to a first aspect of the present disclosure. The method includes:

determining an effective line segment set corresponding to a to-be-processed pixel, where the effective line segment set is a set of curve segments in a line segment array that intersect a ray initiated from the to-be-processed pixel in a predetermined first direction, the curve segments in the line segment array are acquired by segmenting target text based on vector contour information of the target text, and the to-be-processed pixel belongs to pixels in an unsigned distance field image of the target text;

determining interior or exterior position information of the to-be-processed pixel based on the effective line segment set corresponding to the to-be-processed pixel, where the interior or exterior position information is used to indicate whether the to-be-processed pixel is located in an interior region or an exterior region of the target text; and generating a signed distance field image of the target text from the unsigned distance field image of the target text based on the interior or exterior position information of the to-be-processed pixel.

In an embodiment, before determining the effective line segment set corresponding to the to-be-processed pixel, the method further includes:

ranking the curve segments in the line segment array based on coordinate data of the curve segments in the line segment array in a predetermined second direction, to obtain a ranked line segment array, where the coordinate data in the predetermined second direction includes maximum values or minimum values of the curve segments in the predetermined second direction, and the predetermined second direction is perpendicular to the predetermined first direction, where the determining the effective line segment set corresponding to the to-be-processed pixel includes:

determine the effective line segment set corresponding to the to-be-processed pixel based on the ranked line segment array, where the effective line segment set includes curve segments whose coordinate data in the predetermined second direction meets a predetermined effective condition of the to-be-processed pixel.

In an embodiment, before determining the effective line segment set corresponding to the to-be-processed pixel, the method further includes:

determining the to-be-processed pixel from the pixels in the unsigned distance field image of the target text using a predetermined traversal strategy, where the predetermined traversal strategy is in correspondence with the predetermined second direction, where determining the effective line segment set corresponding to the to-be-processed pixel includes:

determining a current line segment set corresponding to the to-be-processed pixel, where the current line segment set is an effective line segment set corresponding to a previous to-be-processed pixel or a line segment set initialized as empty; and determining the effective line segment set corresponding to the to-be-processed pixel based on the ranked line segment array and the current line segment set, and updating the current line segment set with the effective line segment set, where after the determining interior or exterior position information of the to-be-processed pixel based on the effective line segment set corresponding to the to-be-processed pixel, the method further includes:

determining whether determination of interior or exterior position information is completed for all the pixels in the unsigned distance field image of the target text; and returning to the determining the to-be-processed pixel from the pixels in the unsigned distance field image of the target text using a predetermined traversal strategy, in a case that the determination of interior or exterior position information is not completed for all the pixels in the unsigned distance field image of the target text.

In an embodiment, before determining the effective line segment set corresponding to the to-be-processed pixel, the method further includes:

storing a curve segment in the line segment array with a radian less than a predetermined radian threshold or with a length less than a predetermined length threshold as a straight segment; and generating the unsigned distance field image of the target text based on the line segment array, where a distance field value of each of the pixels in the unsigned distance field image is a minimum distance from the pixel to curve segments or straight segments in the line segment array.

In an embodiment, before generating the unsigned distance field image of the target text based on the line segment array, the method further includes: converting a third-order Bezier curve in the line segment array to a second-order Bezier curve.

In an embodiment, before determining the effective line segment set corresponding to the to-be-processed pixel, the method further includes: determining whether the to-be-processed pixel is located in an interior region of drawn text, and in a case that the to-be-processed pixel is not located in the interior region of drawn text, determining the effective line segment set corresponding to the to-be-processed pixel.

In an embodiment, the predetermined first direction is an x-axis direction in a pre-constructed two-dimensional coordinate system, and the predetermined second direction is a y-axis direction in the two-dimensional coordinate system; the predetermined traversal strategy is to firstly traverse along the x-axis direction and then to traverse along the y-axis direction; and the predetermined effective condition is that a y-axis coordinate of the to-be-processed pixel is located between a maximum value and a minimum value in the predetermined second direction.

An apparatus for generating a signed distance field image is provided according to a second aspect of the present disclosure. The apparatus includes:

a first determining module, configured to determine an effective line segment set corresponding to a to-be-processed pixel, where the effective line segment set is a set of curve segments in a line segment array that intersect a ray initiated from the to-be-processed pixel in a predetermined first direction, the to-be-processed pixel belongs to pixels in an unsigned distance field image of target text, and the curve segments in the line segment array are acquired by segmenting the target text based on vector contour information of the target text;

a second determining module, configured to determine interior or exterior position information of the to-be-processed pixel based on the effective line segment set corresponding to the to-be-processed pixel, where the interior or exterior position information is used to indicate whether the to-be-processed pixel is located in an interior region or an exterior region of the target text; and a generating module, configured to generate a signed distance field image of the target text from the unsigned distance field image of the target text based on the interior or exterior position information of the to-be-processed pixel.

A computer-readable storage medium is provided according to a third aspect of the present disclosure. The computer-readable storage medium stores instructions, and the instructions, when being executed by a terminal device, cause the terminal device to perform the method described above.

A device is provided according to a fourth aspect of the present disclosure. The device includes a memory, a processor and a computer program stored in the memory and executable on the processor. The processor, when executing the computer program, performs the method described above.

A computer program product is provided according to a fifth aspect of the present disclosure. The computer program product includes a computer program or instructions. The computer program or instructions, when being executed by a processor, performs the method described above.

Compared with the conventional technology, the technical solutions according to the embodiments of the present disclosure have the following advantages.

A method for generating a signed distance field image is provided according to the embodiments of the present disclosure. An effective line segment set corresponding to a to-be-processed pixel is determined, then interior or exterior position information of the to-be-processed pixel is determined based on the effective line segment set corresponding to the to-be-processed pixel, and a signed distance field image of the target text is generated after interior or exterior position information of each of pixels in an unsigned distance field image of the target text is determined. According to the embodiments of the present disclosure, the interior or exterior position information is determined based on the effective line segment set corresponding to the to-be-processed pixel without traversing all curve segments of the target text. Therefore, according to the embodiment of the present disclosure, the efficiency of determining the interior or exterior position information of the pixels is improved, thereby improving the overall efficiency of generating the signed distance field image of the target text.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly illustrate technical solutions in embodiments of the present disclosure or in the conventional technology, the drawings to be used in the description of the embodiments or the conventional technology are briefly described below. Apparently, those skilled in the art may obtain other drawings according to the provided drawings without any creative work.

FIG. 1 is a flow chart of a method for generating a signed distance field image according to an embodiment of the present disclosure;

FIG. 3 is a flow chart of a method for generating a signed distance field image according to another embodiment of the present disclosure;

DETAILED DESCRIPTION

Figure 2:
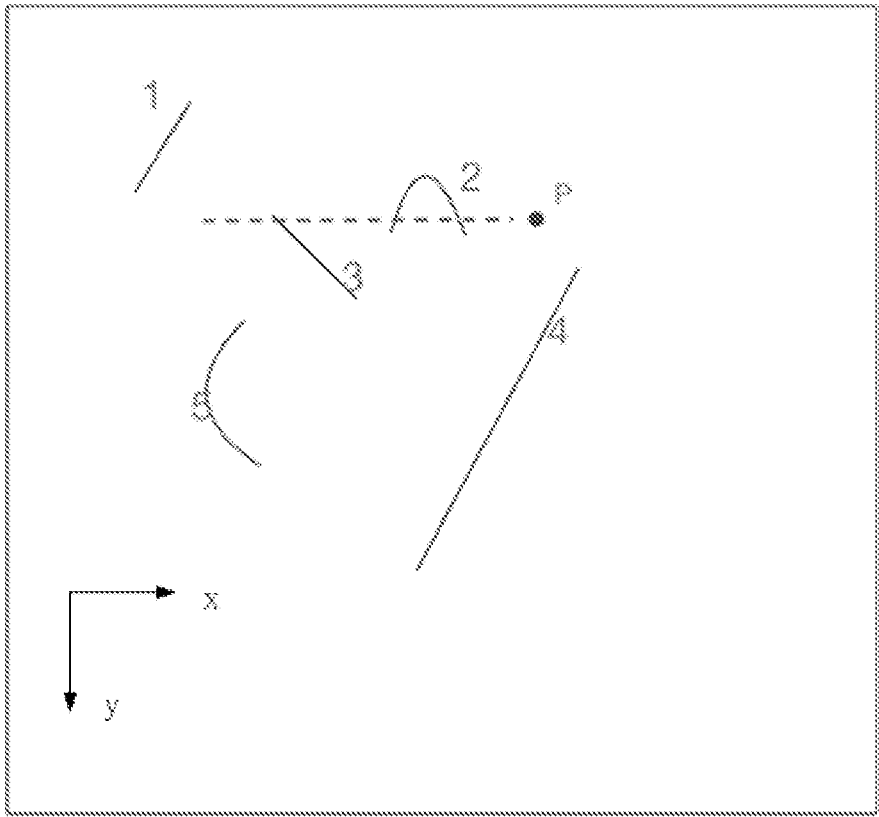
FIG. 2 is a schematic diagram of determining an effective line segment set according to an embodiment of the present disclosure.

In order to more clearly understand the above objectives, features, and advantage of the present disclosure, the solutions of the present disclosure are further described hereinafter. It should be noted that the embodiments of the present disclosure and the features in the embodiments may be combined with each other if there is no conflict.

In the following detailed description, numerous specific details are set forth in order to provide thorough understanding of the present disclosure. The present disclosure may also be implemented in other ways different from those described here. Apparently, the embodiments in the specification are only a part of the embodiments of the present disclosure, rather than all the embodiments.

A distance field image of text records a minimum distance from each of pixels inside and outside the text to a contour (also referred to as the boundary) of the text, where the minimum distance is also referred to as a distance field value. The distance field values in the signed distance field image of text may be used to determine whether each of the pixels is located in an interior region of the text or in an exterior region of the text. Specifically, distance field values of pixels located in the interior region of the text are set to negative numbers, and distance field values of pixels located in the exterior region of the text are set to positive numbers.

Currently, a method for generating a signed distance field image of text includes a line-drawing phase, a shape-drawing phase, and a color reverse and signed transformation phase. During the line-drawing phase, an unsigned distance field image of text is drawn. During the shape-drawing phase, it is to determine whether each of pixels in the unsigned distance field image is located in an interior region of the text or an exterior region of the text. During the color reverse and signed transformation phase, color reverse processing is performed on pixels located in the interior region of the text in the unsigned distance field image. Finally, the signed distance field image of the text is obtained.

During the shape-drawing phase, in the process of determining whether each of the pixels in the unsigned distance field image is located in the interior region of the text or the exterior region of the text, it is required to traverse all curve segments forming the text, to determine curve segment(s) intersecting rays initiated from the pixel, and then determine whether the pixel is located in the interior region of the text or the exterior region of the text according to the odd-even rule or the non-zero winding number rule.

However, according to the conventional technology, for each of the pixels in the undirected distance field image, it is required to traverse all curve segments forming the text, to determine interior or exterior position information of the pixel, resulting in time-consuming and inefficient determination, ultimately resulting in a low overall efficiency of generating the signed distance field image of the text.

Based on this, a method for generating a signed distance field image according to an embodiment of the present disclosure, in which a manner for counting pixels and a manner for determining whether a pixel is located in the interior region of text based on a counting result during the shape-drawing phase are changed, to improve the accuracy of determining interior or exterior position of each of pixels in an overlapping region of closed curves in the text, thereby improving the accuracy of generating the signed distance field image.

Specifically, the method for generating a signed distance field image according to the embodiment of the present disclosure may be applied to a central processing unit (CPU). Firstly, an effective line segment set corresponding to a to-be-processed pixel is determined, where the effective line segment set is a set of curve segments in a line segment array that intersect a ray initiated from the to-be-processed pixel in a predetermined first direction, the curve segments in the line segment array are acquired by segmenting target text based on vector contour information of the target text, and the to-be-processed pixel belongs to pixels in an unsigned distance field image of the target text. Then, interior or exterior position information of the to-be-processed pixel is determined based on the effective line segment set corresponding to the to-be-processed pixel. Finally, after interior or exterior position of each of the pixels in the unsigned distance field image is determined, a signed distance field image of the target text is generated.

The method for generating a signed distance field image according to the embodiment of the present disclosure may be applied to various device models. Compared with the method in the conventional technology where some device models generate signed distance field images using a GPU, while other device models generate signed distance field images using a CPU, the difference in the display of signed distance field images generated by different device models for the same target text is eliminated according to the embodiment of the present disclosure.

In addition, in the CPU-implemented method for generating a signed distance field image according to the embodiment of the present disclosure, interior or exterior position information of a to-be-processed pixel is determined based on an effective line segment set corresponding to the to-be-processed pixel. As compared with the conventional CPU-implemented method for generating a signed distance field image, it is not needed to traverse all curve segments of the target text, improving the efficiency of determining the interior or exterior position information of pixels, thereby improving the overall efficiency of generating the signed distance field image of the target text.

Based on this, a method for generating a signed distance field image is provided according to an embodiment of the present disclosure. Reference is made to FIG. 1, which is a flow chart of a method for generating a signed distance field image according to an embodiment of the present disclosure. The method includes the following steps S101 to S103.

In step S101, an effective line segment set corresponding to a to-be-processed pixel is determined. The effective line segment set is a set of curve segments in a line segment array that intersect a ray initiated from the to-be-processed pixel in a predetermined first direction. The curve segments in the line segment array are acquired by segmenting a target text based on vector contour information of the target text, and the to-be-processed pixel belongs to pixels in an unsigned distance field image of the target text.

According to the embodiment of the present disclosure, the vector contour information of the target text is first acquired. The vector contour information of the target text may include a vector map or bitmap of the target text. During the line-drawing phase of generating the signed distance field image of the target text, the target text is segmented into a large number of curve segments based on the vector contour information of the target text. For each of the curve segments acquired by segmenting the target text, a cuboid (also known as a bounding box) with a predetermined dimension surrounding the curve segment is drawn, and then a distance from each of pixels within the cuboid to the curve segment is calculated using analytic geometry or other methods. After distances from the pixel to all curve segments are calculated, a minimum distance among the distances serves as a distance field value of the pixel, and the distance field value serves as color information for drawing (that is, a larger distance field value indicates a darker color), thereby acquiring an unsigned distance field image of the target text.

According to the embodiment of the present disclosure, during the shape-drawing phase, the effective line segment set corresponding to the to-be-processed pixel is determined from the curve segments acquired by segmenting the target text based on the vector contour information of the target text. According to the embodiment of the present disclosure, the curve segments acquired by segmenting the target text based on the vector contour information of the target text may be stored in the line segment array for subsequent use. Specifically, position information of each of the curve segments is further stored in the line segment array, such as coordinate information for describing a position of the curve segment.

In practices, after the line segment array storing the curve segments and the position information of the curve segments is acquired, the effective line segment set corresponding to the to-be-processed pixel is determined based on the line segment array. The to-be-processed pixel belongs to pixels in the unsigned distance field image of the target text. Specifically, the to-be-processed pixel may be an arbitrary pixel in the unsigned distance field image.

The curve segments intersecting the ray initiated from a pixel are useful for determining interior or exterior position information of the pixel, while other curve segments are useless in the process of determining the interior or exterior position information of the pixel. Therefore, according to the embodiment of the present disclosure, before the interior or exterior position information of the to-be-processed pixel is determined, the effective line segment set corresponding to the to-be-processed pixel is determined, and then the interior or exterior position information is determined based on the curve segments in the effective line segment set while the useless curve segments are not involved in the determination of the interior or exterior position information. Therefore, according to the embodiment of the present disclosure, the efficiency of determining the interior or exterior position information of the pixels is improved.

Reference is made to FIG. 2, which is a schematic diagram of determining an effective line segment set according to an embodiment of the present disclosure. Curve segments labeled as 1 to 5 are acquired by segmenting the target text based on the vector contour information of the target text, a pixel P is an arbitrary pixel in the unsigned distance field image of the target text, and a ray taking the pixel P as an origin and extending along an x-axis direction intersects a curve segment 2 and a curve segment 3. Therefore, the effective line segment set corresponding to the pixel P includes the curve segment 2 and the curve segment 3, while a curve segment 1, a curve segment 4, and a curve segment 5 are useless line segments for the pixel P.

It can be understood that, assuming that a positive y-axis direction in FIG. 2 is a downward direction, a maximum value in the y-axis direction of the curve segment 2 intersecting the ray in FIG. 2 is greater than a y-axis coordinate of the pixel P, and a minimum value in the y-axis direction of the curve segment 2 is less than the y-axis coordinate of the pixel P. Similarly, the curve segment 3 also has the above characteristics. Therefore, according to the embodiment of the present disclosure, effective line segment sets corresponding to respective pixels may be determined based on the position information of the curve segments stored in the line segment array. That is, a curve segment, whose maximum value and minimum value in the y-axis form an interval including the y-axis coordinate of the to-be-processed pixel, is determined as an effective line segment for the to-be-processed pixel. Such curve segments form the effective line segment set corresponding to the to-be-processed pixel.

In step S102, the interior or exterior position information of the to-be-processed pixel is determined based on the effective line segment set corresponding to the to-be-processed pixel. The interior or exterior position information is used to indicate whether the to-be-processed pixel is located in an interior region or an exterior region of the target text.

According to the embodiment of the present disclosure, after the effective line segment set corresponding to the to-be-processed pixel is determined, the interior or exterior position information of the to-be-processed pixel is determined based on the curve segments in the effective line segment set.

In an embodiment, the interior or exterior position information of the to-be-processed pixel may be determined based on the curve segments in the effective line segment set according to the odd-even rule or the non-zero winding number rule. Specifically, the non-zero winding number rule is taken as an example, intersections between the curve segments in the effective line segment set and the ray initiated from the to-be-processed pixel in the predetermined first direction is firstly counted. For example, the counting is as follows: in a case that the ray is passed through from right to left, the winding number is increased by 1; and in a case that the ray is passed through from left to right, the winding number is reduced by 1. As shown in FIG. 2, a direction of the curve segment 2 and a direction of the curve segment 3 are first determined. Assuming that the direction of the curve segment 2 is from left to right, and the direction of the curve segment 3 is from right to left. The curve segment 2 passes through the ray from left to right, and the winding number of the pixel P is increased by 1. The curve segment 3 passes through the ray from right to left, and the winding number of the pixel P is reduced by 1. Finally, the winding number of the pixel P is zero. In the non-zero winding number rule, in a case that the winding number is a non-zero number, the pixel P is located in the interior region of the target text; in a case that the winding number is zero, the pixel P is located in the exterior region of the target text. That is, the interior or exterior position information of the to-be-processed pixel is determined by determining the winding number of the to-be-processed pixel.

In step S103, a signed distance field image of the target text is generated from the unsigned distance field image of the target text based on the interior or exterior position information of the to-be-processed pixel.

According to the embodiment of the present disclosure, after the interior or exterior position information of each of the pixels in the unsigned distance field image of the target text is determined, it may be determined whether the pixel is located in the interior region or the exterior region of the target text. Then, color reverse processing is performed, in the unsigned distance field image, for the pixels located in the interior region of the target text during the color reverse and signed transformation phase, to acquire the signed distance field image of the target text.

In the method for generating a signed distance field image according to the embodiment of the present disclosure, the interior or exterior position information is determined based on the effective line segment set corresponding to the to-be-processed pixel without traversing all curve segments of the target text. Therefore, according to the embodiment of the present disclosure, the efficiency of determining the interior or exterior position information of the pixels is improved, thereby improving the overall efficiency of generating the signed distance field image of the target text.

In order to improve the efficiency of determining the effective line segment set corresponding to the to-be-processed pixel, according to the embodiment of the present disclosure, the curve segments in the line segment array may be ranked to obtain a ranked line segment array. Then, the effective line segment set corresponding to the to-be-processed pixel is determined based on the ranked line segment array.

Specifically, according to the embodiment of the present disclosure, the curve segments in the line segment array may be ranked based on coordinate data of the curve segments in the line segment array in a predetermined second direction, to obtain the ranked line segment array. The line segment array includes the curve segments acquired by segmenting the target text based on the vector contour information of the target text. The coordinate data in the predetermined second direction includes maximum values or minimum values of the curve segments in the predetermined second direction, and the predetermined second direction is perpendicular to the predetermined first direction.

In an embodiment, a two-dimensional coordinate system is pre-constructed, and the positive y-axis direction is defined as the downward direction. The predetermined second direction is the y-axis direction in the two-dimensional coordinate system, and the predetermined first direction described above is the x-axis direction perpendicular to the y-axis direction.

The line segment array stores minimum values of all the curve segments in the y-axis direction. All curve segments in the line segment array are ranked based on the minimum values in the y-axis direction, to obtain the ranked line segment array.

For example, as shown in FIG. 2, all the curve segments are ranked in an ascending order based on the minimum values of the curve segments in the y-axis direction, the curve segments in the ranked line segment array are the curve segment 1, the curve segment 2, the curve segment 3, the curve segment 4, and the curve segment 5 in sequence.

According to the embodiment of the present disclosure, after the ranked line segment array is obtained, the effective line segment set corresponding to the to-be-processed pixel is determined based on the ranked line segment array. The ranked line segment array not only stores the minimum values of all the curve segments in the y-axis direction, but also stores maximum values of the curve segments in the y-axis direction. If a y-axis coordinate of a pixel is located between a maximum value and a minimum value of a curve segment in the y-axis direction, a ray taking the pixel as the origin inevitably passes through the curve segment. Therefore, according to the embodiment of the present disclosure, the effective line segment set corresponding to the to-be-processed pixel may be determined based on maximum values and minimum values of all the curve segments in the y-axis direction, as well as the ranking of all the curve segments based on the minimum values. The curve segments in the effective line segment set are curve segments which are passed through by the ray taking the to-be-processed pixel as the origin. The effective line segment set includes curve segments whose coordinate data in the predetermined second direction meets a predetermined effective condition of the to-be-processed pixel. In an example where the second direction is the y-axis direction, the meeting the predetermined effective condition of the to-be-processed pixel is that a y-axis coordinate of the to-be-processed pixel is located between a maximum value and a minimum value in the y-axis direction.

As shown in FIG. 2, based on the y-axis coordinate of the pixel P, a curve segment, whose maximum value and minimum value in the y-axis form an interval including the y-axis coordinate of the pixel P, is determined as an effective line segment for the pixel P and is added to the effective line segment set corresponding to the pixel P.

In this way, it may be determined that the curve segment 1 is not an effective line segment for the pixel P, while the curve segment 2 and the curve segment 3 are effective line segments for the pixel P. The curve segment 4 has a minimum value in the y-axis direction greater than the y-axis coordinate of the pixel P, and thus the curve segment 4 is not the effective line segment for the pixel P. Since the curve segment 5 is ranked behind the curve segment 4 and the curve segment 4 has the minimum value in the y-axis direction greater than the y-axis coordinate of the pixel P, considering that each curve segment ranked behind the curve segment 4 obviously has a minimum value in the y-axis direction greater than the y-axis coordinate of the pixel P, it may be determined, just based on the ranking without traversing the curve segments ranked behind the curve segment 4, that the effective line segment set corresponding to the pixel P includes the curve segment 2 and the curve segment 3. It can be seen that according to the embodiment of the present disclosure, the efficiency of determining the to-be-processed pixel is improved.

It should be noted that in the above embodiment, all curve segments in the line segment array may be ranked based on maximum values of the curve segments in the y-axis direction to obtain the ranked line segment array. Then, the effective line segment set corresponding to the to-be-processed pixel is determined based on the ranked line segment array.

In another embodiment, the predetermined second direction may be the x-axis direction in the pre-constructed two-dimensional coordinate system. All the curve segments in the line segment array may be ranked based on maximum values or minimum value in the x-axis direction to obtain the ranked line segment array. Then, the effective line segment set corresponding to the to-be-processed pixel is determined based on an x-axis coordinate of the to-be-processed pixel. For the specific implementations, reference is made to the above description, which is not repeated herein.

According to the embodiment of the present disclosure, the effective line segment set is determined based on the ranked line segment array, which can improve the efficiency of determining effective line segment sets corresponding to respective pixels, and ultimately improve the overall efficiency of generating the signed distance field image of the target text.

Based on the above embodiments, a method for generating a signed distance field image is further provided according to an embodiment of the present disclosure. Reference is made to FIG. 3, which is a flow chart of a method for generating a signed distance field image according to another embodiment of the present disclosure. The method includes the following steps S301 to S307.

In step S301, the curve segments in the line segment array are ranked based on the coordinate data in the predetermined second direction of the curve segments in the line segment array, to obtain a ranked line segment array.

The line segment array includes curve segments acquired by segmenting the target text based on the vector contour information of the target text. The coordinate data in the predetermined second direction includes the maximum values or minimum values of the curve segments in the predetermined second direction, and the predetermined second direction is perpendicular to the predetermined first direction.

According to the embodiment of the present disclosure, during the line-drawing phase, after the target text are segmented into a large number of the curve segments based on the vector contour information of the target text, the curve segments and position information of each of the curve segments may be stored in the line segment array. The line segment array stores coordinate data in the predetermined second direction of all the curve segments, such as the minimum values in the y-axis direction.

The curve segments in the line segment array are ranked based on the coordinate data in the predetermined second direction, to obtain the ranked line segment array, which is used to determine effective line segment sets corresponding to respective pixels in the unsigned distance field image of the target text. Assuming that the predetermined second direction is the y-axis direction, the curve segments stored in the ranked line segment array may be ranked in the ascending order based on the minimum values in the y-axis direction.

In step S302, the to-be-processed pixel is determined from the pixels in the unsigned distance field image of the target text using a predetermined traversal strategy. The predetermined traversal strategy is in correspondence with the predetermined second direction.

According to the embodiment of the present disclosure, in order to generate the signed distance field image of the target text, it is required to determine the interior or exterior position information of each of the pixels in the unsigned distance field image of the target text, that is, to determine whether each of the pixels is located in the interior region or the exterior region of the target text. Therefore, each of the pixels in the unsigned distance field image of the target text is to be taken as the to-be-processed pixel.

According to the embodiment of the present disclosure, the strategy for traversing the pixels in the unsigned distance field image of the target text is determined based on a ranking strategy of the ranked line segment array. Assuming that the curve segments in the ranked line segment array are ranked based on the minimum values or the maximum values in the y-axis direction, the pixels in the unsigned distance field image of the target text may be traversed row by row in the x-axis direction, and each of the traversed pixels sequentially serves as the to-be-processed pixel in the embodiment of the present disclosure. Assuming that the curve segments in the ranked line segment array are ranked based on the minimum values or the maximum values in the x-axis direction, the pixels in the unsigned distance field image of the target text may be traversed column by column in the y-axis direction. Specifically, in a case that the predetermined second direction is the y-axis direction, the predetermined traversal strategy is to traverse along the x-axis direction, that is, row-by-row traversal. In a case that the predetermined second direction is the x-axis direction, the predetermined traversal strategy is to traverse along the y-axis direction, that is, column-by-column traversal.

According to the embodiment of the present disclosure, by following the predetermined traversal strategy such as the row-by-row traversal, a to-be-processed pixel in a current iteration may be determined based on position information of a previous to-be-processed pixel, to determine the interior or exterior position information of the to-be-processed pixel.

In step S303, a current line segment set corresponding to the to-be-processed pixel is determined.

The current line segment set is an effective line segment set corresponding to a previous to-be-processed pixel or a line segment set initialized as empty.

According to the embodiment of the present disclosure, the current line segment set may be initialized as empty. A first to-be-processed pixel in the unsigned distance field image of the target text is also referred to as an initial pixel, and a line segment set initialized as empty may serve as the current line segment set corresponding to the initial pixel.

For each of to-be-processed pixels other than the initial pixel, a current line segment set corresponding to the to-be-processed pixel is an effective line segment set corresponding to a previous to-be-processed pixel.

In step S304, the effective line segment set corresponding to the to-be-processed pixel is determined based on the ranked line segment array and the current line segment set, and the current line segment set is updated with the effective line segment set corresponding to the to-be-processed pixel.

The effective line segment set is a set of curve segments in a line segment array that intersect a ray initiated from the to-be-processed pixel in a predetermined first direction. The curve segments in the line segment array are acquired by segmenting the target text based on the vector contour information of the target text, and the to-be-processed pixel belongs to the pixels in the unsigned distance field image of the target text. The effective line segment set includes the curve segment whose coordinate data in the predetermined second direction meets the effective condition of the to-be-processed pixel.

According to the embodiment of the present disclosure, the current line segment set may be initialized as empty. The first to-be-processed pixel in the unsigned distance field image of the target text is also referred to as the initial pixel. The effective line segment set may be determined based on the ranked line segment array, in a way described in the above embodiments, which is not repeated herein. After an effective line segment set corresponding to the initial pixel is determined, the effective line segment set serves as a current line segment set to be used by a next to-be-processed pixel.

For each of pixels other than the initial pixel, a current line segment set of the pixel is an effective line segment set corresponding to a previous to-be-processed pixel of the pixel, and then the effective line segment set corresponding to the pixel is determined based on the ranked line segment array and the current line segment set. Specifically, since the to-be-processed pixel is determined according to the predetermined traversal strategy such as row-by-row traversal, and to-be-processed pixels in a same row have a same y-axis coordinate, the to-be-processed pixels in the same row correspond to a same effective line segment set. Therefore, the current line segment set may be directly determined as the effective line segment set corresponding to the to-be-processed pixel.

For example, as shown in FIG. 2, assuming that the to-be-processed pixel is a pixel H located on a same row as the pixel P, it may be determined that an effective line segment set corresponding to the pixel H is the same as an effective line segment set corresponding to the pixel P, that is, the effective line segment set including the curve segment 2 and the curve segment 3.

Assuming that the predetermined traversal strategy is the row-by-row traversal, after an effective line segment set corresponding to a last pixel in a previous row is determined, the effective line segment set is used as the current line segment set. After a pixel in a next row adjacent to the previous row is determined as the to-be-processed pixel, an effective line segment set corresponding to the to-be-processed pixel is determined based on the current line segment set and the ranked line segment array. Specifically, it is determined whether a next curve segment in the ranked line segment array ranked behind the effective line segment in the current line segment set is an effective line segment for the to-be-processed pixel. In a case that the next curve segment is the effective line segment for the to-be-processed pixel, the curve segment is added to the current line segment set, and then the determination is performed for next curve segment by following the ranking, until a curve segment that is not an effective line segment for the to-be-processed pixel is found. In such case, the current line segment set is determined as the effective line segment set corresponding to the to-be-processed pixel.

As shown in FIG. 2, assuming that the current line segment set includes the curve segment 2 and the curve segment 3, in the process of determining the effective line segment set corresponding to the to-be-processed pixel based on the current line segment set and the ranked line segment array, it is determined whether the curve segment 4 ranked behind the curve segment 2 and the curve segment 3 is the effective line segment for the to-be-processed pixel, that is, it is determined whether a y-axis coordinate of the to-be-processed pixel is located between a maximum value and a minimum value in the y-axis direction of the curve segment 4. In a case that the y-axis coordinate of the to-be-processed pixel is located between the maximum value and the minimum value in the y-axis direction of the curve segment 4, it indicates that the curve segment 4 is the effective line segment for the to-be-processed pixel, and the curve segment 4 is added to the current line segment set.

Then it is determined whether the curve segment 5 ranked behind the curve segment 4 is the effective line segment for the to-be-processed pixel. In a case that the curve segment 5 is not the effective line segment for the to-be-processed pixel, the current line segment set is determined as the effective line segment set corresponding to the to-be-processed pixel. In fact, since all the curve segments are ranked, after it is determined that the curve segment 5 is not the effective line segment for the to-be-processed pixel, it may be determined that other curve segments ranked behind the curve segment 5 are not effective line segments for the to-be-processed pixel.

It can be seen that according to the embodiment of the present disclosure, the current line segment set is determined and updated based on the ranked curve segments, and the effective line segment set corresponding to the to-be-processed pixel is determined based on the current line segment set, which can greatly improve the efficiency of determining the effective line segment set and ultimately improve the overall efficiency of generating the signed distance field image of the target text.

In step S305, the interior or exterior position information of the to-be-processed pixel is determined based on the effective line segment set corresponding to the to-be-processed pixel.

The interior or exterior position information is used to indicate whether the to-be-processed pixel is located in an interior region or an exterior region of the target text.

The step S305 in the embodiment of the present disclosure is the same as the step S102 in the above embodiment, which is not repeated herein and may be understood with reference to the step S102.

In step S306, it is determined whether determination of interior or exterior position information is completed for all the pixels in the unsigned distance field image of the target text. In a case that the determination of interior or exterior position information is completed for all the pixels in the unsigned distance field image of the target text, step S307 is performed; and in a case that the determination of interior or exterior position information is not completed for all the pixels in the unsigned distance field image of the target text, step S302 is performed.

According to the embodiment of the present disclosure, after the interior or exterior position information of the to-be-processed pixel in the current iteration is determined, it is determined whether determination of interior or exterior position information is completed for all the pixels in the unsigned distance field image of the target text. In a case that the determination of interior or exterior position information is not completed for all the pixels in the unsigned distance field image of the target text, the step S302 is performed, that is, a new to-be-processed pixel is determined for a next iteration. In a case that the determination of interior or exterior position information is completed for all the pixels in the unsigned distance field image of the target text, step S307 is performed, that is, the signed distance field image of the target text is generated.

In step S307, a signed distance field image is generated from the unsigned distance field image of the target text based on the interior or exterior position information of the to-be-processed pixel.

According to the embodiment of the present disclosure, after the interior or exterior position information of each of the pixels in the unsigned distance field image of the target text is determined, the signed distance field image is generated from the unsigned distance field image of the target text based on the interior or exterior position information of each of the pixels.

Specifically, after it is determined whether each of the pixels in the unsigned distance field image of the target text is located in the interior region or the exterior region of the target text, color reverse processing is performed, in the unsigned distance field image, for the pixels located in the interior region of the target text during the color reverse and signed transformation phase, thereby acquiring the signed distance field image of the target text.

The method for generating a signed distance field image according to the embodiment of the present disclosure is applied in a CPU, and interior or exterior position information of a to-be-processed pixel is determined based on an effective line segment set corresponding to the to-be-processed pixel. As compared with the conventional CPU-implemented method for generating a signed distance field image, it is not needed to traverse all curve segments of the target text, improving the efficiency of determining the interior or exterior position information of pixels.

In addition, based on this, according to the embodiment of the present disclosure, the current line segment set may be determined and updated based on the ranked curve segment, and the effective line segment set corresponding to the to-be-processed pixel is determined based on the current line segment set, improving the efficiency of determining the effective line segment set, thereby further improving the efficiency of determining the interior or exterior position information of the pixels, and ultimately improving the overall efficiency of generating the signed distance field image of the target text.

In an embodiment, in the line segment array, a curve segment with a radian less than a predetermined radian threshold or with a length less than a predetermined length threshold may be stored as a straight segment, and then the unsigned distance field image of the target text may be generated based on the line segment array.

In practices, a distance field value of each of the pixels in the unsigned distance field image is a minimum distance from the pixel to the target text. Therefore, it is required to calculate distances from the pixel to curve segments segmented from the target text. The efficiency of calculating a distance from a pixel to a straight segment is higher than the efficiency of calculating a distance from the pixel to a curve segment, thus the efficiency of calculating the distance field value of the pixel is improved. Therefore, in the line segment array, by storing the curve segment with the radian less than the predetermined radian threshold or with the length less than the predetermined length threshold as the straight segment, the efficiency of calculating a distance field value of each of pixels may be improved without affecting the accuracy of calculating the distance field value of the pixel, thereby improving the efficiency of generating the unsigned distance field image of the target text, and ultimately improving the efficiency of generating the signed distance field image based on the undirected distance field image.

In practices, in the line segment array, storing the curve segment with the radian less than the predetermined radian threshold or with the length less than the predetermined length threshold as the straight segment means setting the radian of the curve segment to 0, to obtain the straight segment corresponding to the curve segment.

In another embodiment, considering that there may be third-order Bezier curve(s) in the line segment array acquired by segmenting the target text in some fonts (such as otf font and ttc font), while curve segments for generating the signed distance field image are required to be second-order Bezier curves according to the embodiment of the present disclosure, the third-order Bezier curve in the line segment array is converted to the second-order Bezier curve, so that the signed distance field image of the target text may be generated based on the curve segments in the line segment array.

In addition, adjacent texts may be overlapped with each other when drawing the distance field image, and the repetitive determination with regard to interior or exterior position information of those pixels located in interior region of the drawn text may be omitted according to the embodiment of the present disclosure.

Specifically, after the to-be-processed pixel is determined, it is first determined whether the to-be-processed pixel is located in the interior region of the drawn text. In a case that the to-be-processed pixel is not located in the interior region of the drawn text, the effective line segment set corresponding to the to-be-processed pixel is determined, and then the interior or exterior position information of the to-be-processed pixel is determined. In a case that the to-be-processed pixel is located in the interior region of the drawn text, the determination of the effective line segment set corresponding to the to-be-processed pixel may be omitted.

According to the embodiment of the present disclosure, it is not required to redundantly determine the interior or exterior position information of the to-be-processed pixel located in the interior region of the drawn text, thereby improving the efficiency of determining the signed distance field image of the target text.

Figure 4:
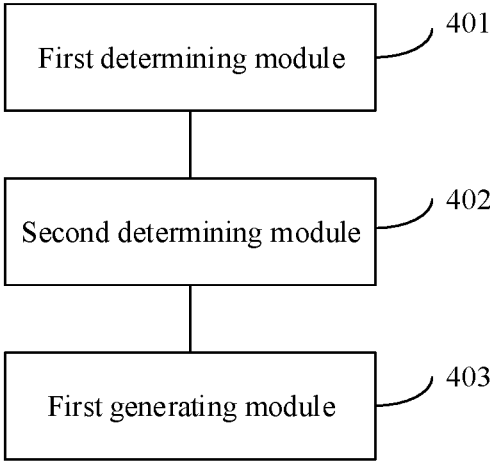
FIG. 4 is a schematic structural diagram of an apparatus for generating a signed distance field image according to an embodiment of the present disclosure.

Based on the method according to the above embodiments, an apparatus for generating a signed distance field image is provided according to the present disclosure. Reference is made to FIG. 4, which is a schematic structural diagram of an apparatus for generating a signed distance field image according to an embodiment of the present disclosure. The apparatus includes a first determining module 401, a second determining module 402 and a first generating module 403.

The first determining module 401 is configured to determine an effective line segment set corresponding to a to-be-processed pixel, where the effective line segment set includes curve segments in a line segment array that intersect a ray initiated from the to-be-processed pixel in a predetermined first direction, the to-be-processed pixel belongs to pixels in an unsigned distance field image of target text, and the curve segments in the line segment array are acquired by segmenting the target text based on vector contour information of the target text.

The second determining module 402 is configured to determine interior or exterior position information of the to-be-processed pixel based on the effective line segment set corresponding to the to-be-processed pixel, where the interior or exterior position information is used to indicate whether the to-be-processed pixel is located in an interior region or an exterior region of the target text.

The first generating module 403 is configured to generate a signed distance field image of the target text from the unsigned distance field image of the target text based on the interior or exterior position information of the to-be-processed pixel.

In an embodiment, the apparatus further includes a ranking module.

The ranking module is configured to rank the curve segments in the line segment array based on coordinate data of the curve segments in the line segment array in a predetermined second direction, to obtain a ranked line segment array, where the line segment array includes curve segments acquired by segmenting the target text based on the vector contour information of the target text, the coordinate data in the predetermined second direction is maximum values or minimum values of the curve segments in the predetermined second direction, and the predetermined second direction is perpendicular to the predetermined first direction.

Accordingly, the first determining module is specifically configured to determine the effective line segment set corresponding to the to-be-processed pixel based on the ranked line segment array, where the effective line segment set includes curve segments whose coordinate data in the predetermined second direction meets a predetermined effective condition of the to-be-processed pixel.

In an embodiment, the apparatus further includes a third determining module.

The third determining module is configured to determine the to-be-processed pixel from the pixels in the unsigned distance field image of the target text using a predetermined traversal strategy, where the predetermined traversal strategy is in correspondence with the predetermined second direction.

Accordingly, the first determining module includes a first determining sub-module and a second determining sub-module.

The first determining sub-module is configured to determine a current line segment set corresponding to the to-be-processed pixel, where the current line segment set is an effective line segment set corresponding to a previous to-be-processed pixel or a line segment set initialized as empty.

The second determining sub-module is configured to determine the effective line segment set corresponding to the to-be-processed pixel based on the ranked line segment array and the current line segment set, and update the current line segment set with the effective line segment set.

The apparatus further includes a determining module. The determining module is configured to determine whether determination of interior or exterior position information is completed for all the pixels in the unsigned distance field image of the target text; and trigger the third determining module, in a case that the determination of interior or exterior position information is not completed for all the pixels in the unsigned distance field image of the target text.

In an embodiment, the apparatus further includes a storing module and a second generating module.

The storing module is configured to store a curve segment in the line segment array with a radian less than a predetermined radian threshold or with a length less than a predetermined length threshold as a straight segment.

The second generating module is configured to generate the unsigned distance field image of the target text based on the line segment array, where a distance field value of each of the pixels in the unsigned distance field image is a minimum distance from the pixel to curve segments or straight segments in the line segment array.

In an embodiment, the apparatus further includes a converting module. The converting module is configured to convert a curve segment in the line segment array belonging to a third-order Bezier curve to a second-order Bezier curve.

In an embodiment, the apparatus further includes a fourth determining module and a triggering module.

The fourth determining module is configured to determine whether the to-be-processed pixel is located in an interior region of drawn text.

The triggering module is configured to trigger the first determining module, in a case that it is determined by the fourth determining module, that the to-be-processed pixel is not located in the interior region of drawn text.

In an embodiment, the predetermined first direction is an x-axis direction in a pre-constructed two-dimensional coordinate system, and the predetermined second direction is a y-axis direction in the two-dimensional coordinate system; the predetermined traversal strategy is to firstly traverse along the x-axis direction and then to traverse along the y-axis direction; and the predetermined effective condition is that a y-axis coordinate of the to-be-processed pixel is located between a maximum value and a minimum value in the predetermined second direction.

In the apparatus for generating a signed distance field image according to the embodiments of the present disclosure, interior or exterior position information of a to-be-processed pixel is determined based on an effective line segment set corresponding to the to-be-processed pixel without traversing all curve segments of the target text, improving the efficiency of determining the interior or exterior position information of pixels.

In addition, based on this, according to the embodiment of the present disclosure, the current line segment set may be determined and updated based on the ranked curve segment, and the effective line segment set corresponding to the to-be-processed pixel is determined based on the current line segment set, improving the efficiency of determining the effective line segment set, thereby further improving the efficiency of determining the interior or exterior position information of the pixels, and ultimately improving the overall efficiency of generating the signed distance field image of the target text.

In addition to the method and the apparatus described above, a computer-readable storage medium is further provided according to an embodiment of the present disclosure. The computer-readable storage medium stores instructions. The instructions, when executed by a terminal device, cause the terminal device to perform the method for generating a signed distance field image according to the embodiments of the present disclosure.

A computer program product is further provided according to an embodiment of the present disclosure. The computer program product includes a computer program or instructions. The computer program or instructions, when executed by a processor, performs the method for generating a signed distance field image according to the embodiments of the present disclosure.

Figure 5:
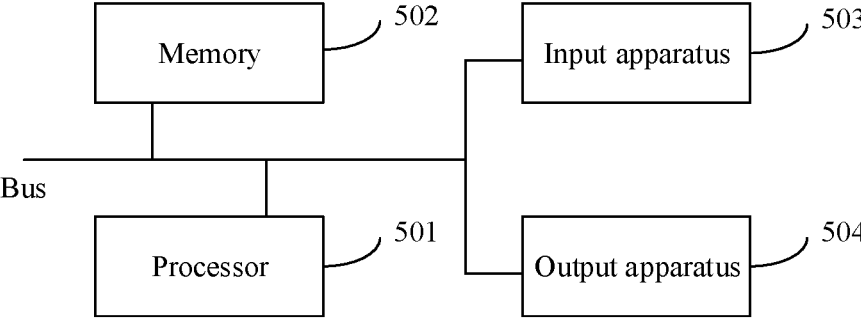
FIG. 5 is a schematic structural diagram of a device for generating a signed distance field image according to an embodiment of the present disclosure.

In addition, a device for generating a signed distance field image is further provided according to an embodiment of the present disclosure. As shown in FIG. 5, the device includes a processor 501, a memory 502, an input apparatus 503 and an output apparatus 504. The number of the processor 401 in the device for generating a signed distance field image may be one or more. For example, as shown in FIG. 5, the number of the processor is one. In some embodiments of the present disclosure, the processor 501, the memory 502, the input apparatus 503 and the output apparatus 504 may be connected to each other through a bus or other ways, and the connection through a bus is taken as an example in FIG. 5.

The memory 502 may be configured to store a software program and a module. The processor 501 runs the software program and the module stored in the memory 502, to perform various functional applications and data processing of the device for generating a signed distance field image. The memory 502 may mainly include a program memory area and a data memory area. The program memory area may store an operating system, an application required by at least one function and the like. In addition, the memory 502 may include a high-speed random access memory, and may further include a non-volatile memory, such as at least one disk storage device, a flash device or other volatile solid-state storage device. The input apparatus 503 may be configured to receive inputted number or character information, and input a signal related to user settings and function control of the device for generating a signed distance field image.

In the embodiment, the processor 501 may load an executable file corresponding to the processes of one or more application programs into the memory 502 in response to an instruction, and the processor 501 runs the application program stored in the memory 502, thereby achieving various functions in the device for generating a signed distance field image described above.

It should be noted that the terms "first", "second" and the like in the description are used for distinguishing an entity or operation from another entity or operation, rather than requiring or implying an actual relationship or order between these entities or operations. In addition, terms of "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, an element defined by a statement of "comprising (including) one . . . " does not exclude a case that other similar elements exist in the process, method, article or device including the element.

The above are only specific implementations of the present disclosure, so that those skilled in the art can understand or implement the present disclosure. It is apparent for those skilled in the art to make many modifications to these embodiments. The general principle defined herein may be applied to other embodiments without departing from the scope of the present disclosure. Therefore, the present disclosure is not limited to the embodiments illustrated herein, but should be defined by the broadest scope consistent with the principle and novel features disclosed herein.

The invention claimed is:

1. A method for generating a signed distance field image, comprising:

determining an effective line segment set corresponding to a to-be-processed pixel, wherein the effective line segment set is a set of curve segments in a line segment array that intersect a ray initiated from the to-be-processed pixel in a predetermined first direction, the curve segments in the line segment array are acquired by segmenting target text based on vector contour information of the target text, and the to-be-processed pixel belongs to pixels in an unsigned distance field image of the target text;

determining interior or exterior position information of the to-be-processed pixel based on the effective line segment set corresponding to the to-be-processed pixel, wherein the interior or exterior position information is used to indicate whether the to-be-processed pixel is located in an interior region or an exterior region of the target text; and generating a signed distance field image of the target text from the unsigned distance field image of the target text based on the interior or exterior position information of the to-be-processed pixel, wherein determining the effective line segment set corresponding to the to-be-processed pixel comprises:

determining a current line segment set corresponding to the to-be-processed pixel, wherein the current line segment set is an effective line segment set corresponding to a previous to-be-processed pixel or a line segment set initialized as empty; and determining the effective line segment set corresponding to the to-be-processed pixel based on a ranked line segment array and the current line segment set, and updating the current line segment set with the effective line segment set.

2. The method according to claim 1, wherein before determining the effective line segment set corresponding to the to-be-processed pixel, the method further comprises:

ranking the curve segments in the line segment array based on coordinate data of the curve segments in the line segment array in a predetermined second direction, to obtain a ranked line segment array, wherein the coordinate data in the predetermined second direction includes maximum values or minimum values of the curve segments in the predetermined second direction, and the predetermined second direction is perpendicular to the predetermined first direction, wherein determining the effective line segment set corresponding to the to-be-processed pixel comprises:

determining the effective line segment set corresponding to the to-be-processed pixel based on the ranked line segment array, wherein the effective line segment set comprises curve segments whose coordinate data in the predetermined second direction meets a predetermined effective condition of the to-be-processed pixel.

3. The method according to claim 2, wherein before determining the effective line segment set corresponding to the to-be-processed pixel, the method further comprises:

determining the to-be-processed pixel from the pixels in the unsigned distance field image of the target text using a predetermined traversal strategy, wherein the predetermined traversal strategy is in correspondence with the predetermined second direction, wherein after determining interior or exterior position information of the to-be-processed pixel based on the effective line segment set corresponding to the to-be-processed pixel, the method further comprises:

determining whether determination of interior or exterior position information is completed for all the pixels in the unsigned distance field image of the target text; and returning to the step of determining the to-be-processed pixel from the pixels in the unsigned distance field image of the target text using the predetermined traversal strategy, in a case that the determination of interior or exterior position information is not completed for all the pixels in the unsigned distance field image of the target text.

4. The method according to claim 3, wherein the predetermined first direction is an x-axis direction in a pre-constructed two-dimensional coordinate system, and the predetermined second direction is a y-axis direction in the two-dimensional coordinate system; the predetermined traversal strategy is to firstly traverse along the x-axis direction and then to traverse along the y-axis direction; and the predetermined effective condition is that a y-axis coordinate of the to-be-processed pixel is located between a maximum value and a minimum value in the predetermined second direction.

5. The method according to claim 1, wherein before determining the effective line segment set corresponding to the to-be-processed pixel, the method further comprises:

storing a curve segment in the line segment array with a radian less than a predetermined radian threshold or with a length less than a predetermined length threshold as a straight segment; and generating the unsigned distance field image of the target text based on the line segment array, wherein a distance field value of each of the pixels in the unsigned distance field image is a minimum distance from the pixel to curve segments or straight segments in the line segment array.

6. The method according to claim 5, wherein before generating the unsigned distance field image of the target text based on the line segment array, the method further comprises:

converting a third-order Bezier curve in the line segment array to a second-order Bezier curve.

7. The method according to claim 1, wherein before determining the effective line segment set corresponding to the to-be-processed pixel, the method further comprises:

determining whether the to-be-processed pixel is located in interior region of a drawn text; and in a case that the to-be-processed pixel is not located in the interior region of the drawn text, determining the effective line segment set corresponding to the to-be-processed pixel.

8. A non-transitory computer-readable storage medium having instructions stored thereon, wherein, the instructions, when being executed by a terminal device, cause the terminal device to perform:

determining an effective line segment set corresponding to a to-be-processed pixel, wherein the effective line segment set is a set of curve segments in a line segment array that intersect a ray initiated from the to-be-processed pixel in a predetermined first direction, the curve segments in the line segment array are acquired by segmenting target text based on vector contour information of the target text, and the to-be-processed pixel belongs to pixels in an unsigned distance field image of the target text;

determining interior or exterior position information of the to-be-processed pixel based on the effective line segment set corresponding to the to-be-processed pixel, wherein the interior or exterior position information is used to indicate whether the to-be-processed pixel is located in an interior region or an exterior region of the target text; and generating a signed distance field image of the target text from the unsigned distance field image of the target text based on the interior or exterior position information of the to-be-processed pixel, wherein the instructions, when being executed by a terminal device, cause the terminal device to further perform:

determining a current line segment set corresponding to the to-be-processed pixel, wherein the current line segment set is an effective line segment set corresponding to a previous to-be-processed pixel or a line segment set initialized as empty; and determining the effective line segment set corresponding to the to-be-processed pixel based on a ranked line segment array and the current line segment set, and updating the current line segment set with the effective line segment set.

9. A device comprising:

a memory, a processor, and a computer program stored in the memory and executable on the processor, wherein the processor, when executing the computer program, performs:

determining an effective line segment set corresponding to a to-be-processed pixel, wherein the effective line segment set is a set of curve segments in a line segment array that intersect a ray initiated from the to-be-processed pixel in a predetermined first direction, the curve segments in the line segment array are acquired by segmenting target text based on vector contour information of the target text, and the to-be-processed pixel belongs to pixels in an unsigned distance field image of the target text;

determining interior or exterior position information of the to-be-processed pixel based on the effective line segment set corresponding to the to-be-processed pixel, wherein the interior or exterior position information is used to indicate whether the to-be-processed pixel is located in an interior region or an exterior region of the target text; and generating a signed distance field image of the target text from the unsigned distance field image of the target text based on the interior or exterior position information of the to-be-processed pixel, wherein the processor is further configured to perform:

determining a current line segment set corresponding to the to-be-processed pixel, wherein the current line segment set is an effective line segment set corresponding to a previous to-be-processed pixel or a line segment set initialized as empty; and determining the effective line segment set corresponding to the to-be-processed pixel based on a ranked line segment array and the current line segment set, and updating the current line segment set with the effective line segment set.

10. The device according to claim 9, wherein the processor is further configured to perform:

ranking the curve segments in the line segment array based on coordinate data of the curve segments in the line segment array in a predetermined second direction, to obtain a ranked line segment array, wherein the coordinate data in the predetermined second direction includes maximum values or minimum values of the curve segments in the predetermined second direction, and the predetermined second direction is perpendicular to the predetermined first direction, and determining the effective line segment set corresponding to the to-be-processed pixel based on the ranked line segment array, wherein the effective line segment set comprises curve segments whose coordinate data in the predetermined second direction meets a predetermined effective condition of the to-be-processed pixel.

11. The device according to claim 10, wherein the processor is further configured to perform:

determining the to-be-processed pixel from the pixels in the unsigned distance field image of the target text using a predetermined traversal strategy, wherein the predetermined traversal strategy is in correspondence with the predetermined second direction, determining whether determination of interior or exterior position information is completed for all the pixels in the unsigned distance field image of the target text; and returning to the step of determining the to-be-processed pixel from the pixels in the unsigned distance field image of the target text using the predetermined traversal strategy, in a case that the determination of interior or exterior position information is not completed for all the pixels in the unsigned distance field image of the target text.

12. The device according to claim 11, wherein the predetermined first direction is an x-axis direction in a preconstructed two-dimensional coordinate system, and the predetermined second direction is a y-axis direction in the two-dimensional coordinate system; the predetermined traversal strategy is to firstly traverse along the x-axis direction and then to traverse along the y-axis direction; and the predetermined effective condition is that a y-axis coordinate of the to-be-processed pixel is located between a maximum value and a minimum value in the predetermined second direction.

13. The device according to claim 9, wherein the processor is further configured to perform:

storing a curve segment in the line segment array with a radian less than a predetermined radian threshold or with a length less than a predetermined length threshold as a straight segment; and generating the unsigned distance field image of the target text based on the line segment array, wherein a distance field value of each of the pixels in the unsigned distance field image is a minimum distance from the pixel to curve segments or straight segments in the line segment array.

14. The device according to claim 13, wherein the processor is further configured to perform:

converting a third-order Bezier curve in the line segment array to a second-order Bezier curve.

15. The device according to claim 9, wherein the processor is further configured to perform:

determining whether the to-be-processed pixel is located in interior region of a drawn text; and in a case that the to-be-processed pixel is not located in the interior region of the drawn text, determining the effective line segment set corresponding to the to-be-processed pixel.

\*    \*    \*    \*    \*